UNITED STATES PATENT OFFICE.

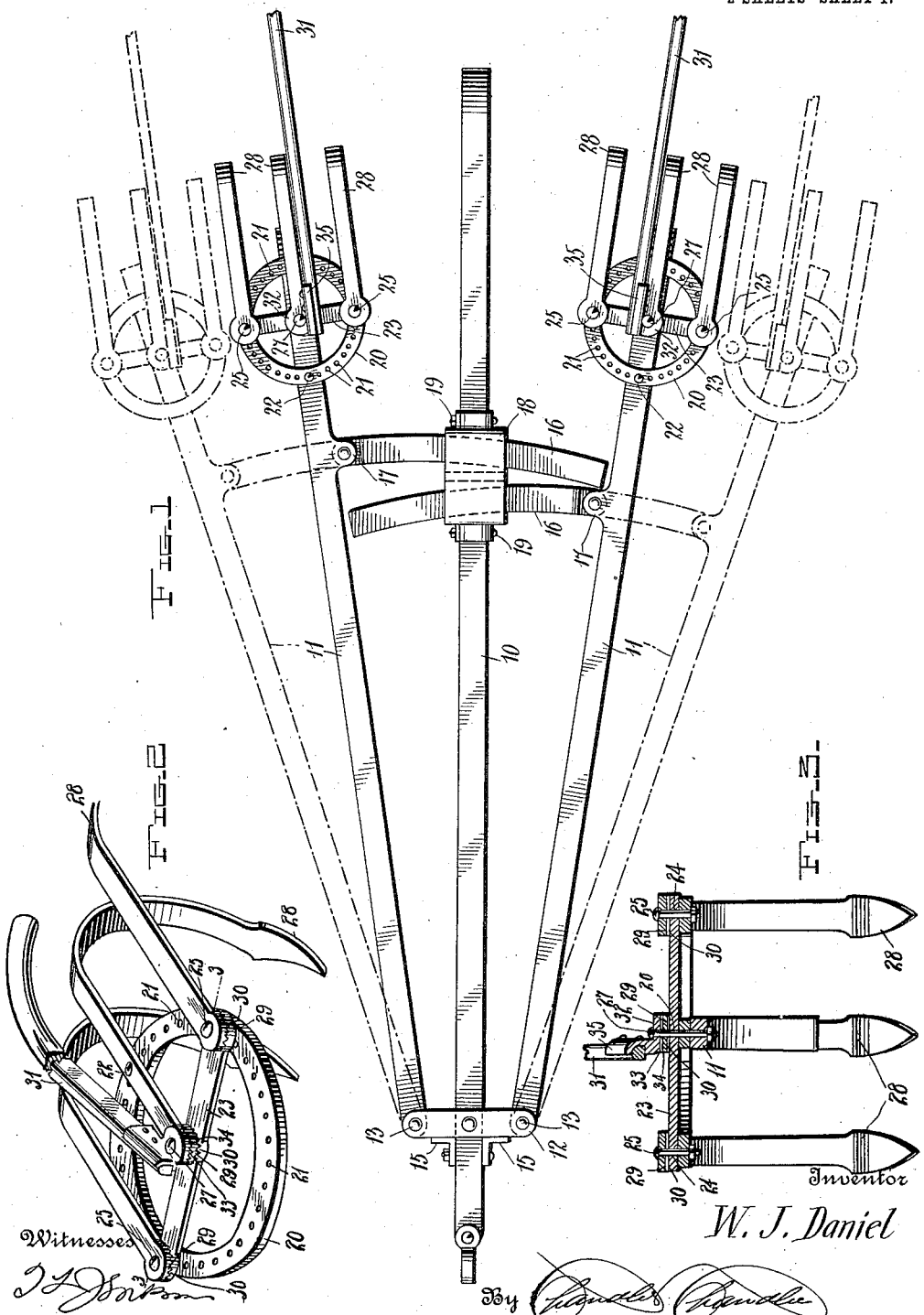

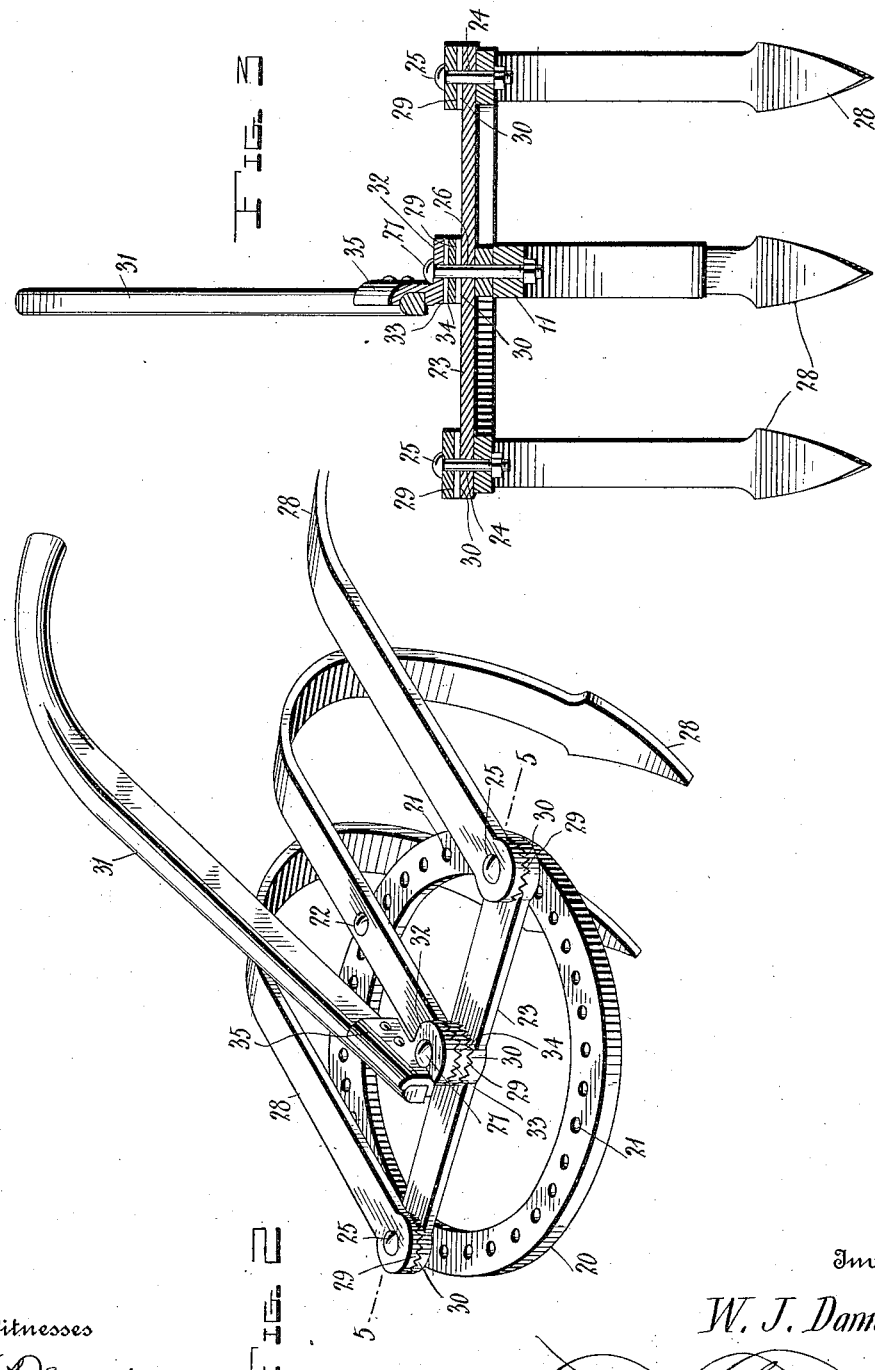

WILLIAM J. DANIEL, OF DREW, MISSISSIPPI.

CULTIVATOR.

1,036,460.

Specification of Letters Patent.  Patented Aug. 20, 1912.

Application filed September 5, 1911.  Serial No. 647,656.

*To all whom it may concern:*

Be it known that I, WILLIAM J. DANIEL, a citizen of the United States, residing at Drew, in the county of Sunflower, State of Mississippi, have invented certain new and useful Improvements in Cultivators; and I do hereby declare the following to be a full, clear, and exact description of the invention, such as will enable others skilled in the art to which it appertains to make and use the same.

This invention relates to cultivators and has for an object to provide a device of this character that will be capable of a greater range of adjustment than ordinary.

To attain the above end I provide a novel annular coupling which connects together a gang of harrow teeth and secures the same to the cultivator beam, the teeth being furthermore adjustably secured to the coupling so as to be capable of being maintained at all times in their most effective working position. Furthermore, to enable the cultivator to be operated where the rows are not spaced equally apart, the outer or gang carrying means are hinged at their forward ends to the main beam and are loosely connected adjacent the gangs to the main beam so that the operator may move the handles outwardly or inwardly at will to maintain the gangs at all times a constant distance from the plants.

With the above and other objects in view the invention consists in the certain novel details of construction and combination of parts hereinafter fully described and claimed it being understood that various modifications may be made in the minor details of construction within the scope of the appended claim.

In the accompanying drawings forming part of this specification:—Figure 1 is a plan view of the cultivator. Fig. 2 is a detail perspective view of one of the couplings applied with parts broken away. Fig. 3 is a cross sectional view on the line 5—5 Fig. 2.

Referring now to the drawings in which like characters of reference designate similar parts, 10 designates the main beam and 11 the gang carrying beams, the latter being pivotally connected at their forward ends to the main beam through the instrumentality of spaced bars 12 which are bolted centrally to the main beam and are terminally equipped with pivot pins 13 which are engaged through eyes 14 formed on the beams 11. Angle iron braces 15 are arranged on opposite sides of the main beam and are bolted thereto, the free legs of the braces bearing on the forward edges of the bars 12 and holding the latter against displacement. For adjustably securing the beams 11 to the main beam 10 arcuate rods 16 are pivotally connected at their outer ends to the beams 11 as shown at 17 and have their inner ends bearing upon the top face of the main beam, an arched bracket 18 being bolted to the beam as shown at 19 and straddling the rods. This bracket performs the function of a guide for directing sliding movements of the rods as the gang carrying beams 11 are manipulated by the handles.

Arranged adjacent to the downwardly curved rear end of each of the beams 11 is an annular coupling 20, the same being provided with a circular series of openings 21 through any particular pair of which securing bolts 22 may be passed for securing the coupling to the beam. Arranged transversely across the beam and bearing with its ends upon the top face of the coupling is a bar 23 which is terminally equipped with openings 24 through which and any particular openings 21 in the annular coupling are passed adjusting bolts 25. The bar is furthermore centrally equipped with an opening 26 which receives a pivot bolt 27. It is now clear that upon withdrawal of the bolts 22 the coupling may be rotated upon the pivot bolt to any desired extent and thus the bar 23 may be maintained in constant angular relation to the main beam regardless of to what extent the gang carrying beam is moved relatively to the main beam.

Preferably three harrow teeth 28 are secured to each coupling, the shanks of the teeth bearing upon the top face of the coupling and being terminally equipped with openings to receive the adjusting bolts 25. Furthermore, the bottom faces of the shanks of the teeth are equipped with ratchet surfaces 29 arranged concentric with the bolt opening and adapted to interfit with similar ratchet surfaces 30 formed on the top face of the bar 23. By loosening the bolts 25 and 27 the teeth may be rotated to any desired extent upon the bar and upon again tightening the bolt the teeth will be anchored in their adjusted positions. Thus it will be seen that upon any movement of the annular coupling, the teeth must also be moved in a counter direction so as at all times to be maintained in their most effective positions.

The cultivator handles 31 are adjustably secured to the beams through the instrumentality of disks 32 which are centrally provided with openings to receive the bolts 27 and are furthermore provided on their bottom faces with ratchet surfaces 33 which interfit with similar ratchet surfaces 34 formed on the top faces of the centermost teeth of each gang. Integral upwardly inclined U-shaped socket members 35 are formed on the top faces of the disks and receive the handles. It is now clear that upon loosening of the bolts 27 the handles may be rotated relatively to the beams 11 to any desired extent and upon again tightening the bolts 27 the handles will be locked in their adjusted positions.

From the above description it will be seen that by virtue of the bracket 18 loosely receiving the arcuate rods 16, the handles may be moved at will toward or away from each other so as to adapt the cultivator to work between rows of plants which are not the same distance apart throughout the length of the rows. Furthermore by virtue of the novel adjustably mounted coupling and teeth, a greater range of adjustability of the harrow may be effected than ordinary while at the same time maintaining the teeth in their most effective working positions.

What is claimed, is:—

In a cultivator, a beam, an annulus on said beam, a bar having central and terminal ratchet surfaces, a plurality of teeth having ratchet surfaces engaging corresponding ratchet surfaces on the bar, the center tooth of the series having a ratchet surface on the top face, a handle having a ratchet surface engaging the last named ratchet surface, a pin passed through the ratchet surfaced portions of the handle, said center tooth and said beam, and pins passed through the terminal ratchet surfaced portions of the bar, related teeth, and annulus.

In testimony whereof, I affix my signature, in presence of two witnesses.

WILLIAM J. DANIEL.

Witnesses:
S. R. BRATTAN,
GEO. H. CHANDLEE.

---

Copies of this patent may be obtained for five cents each, by addressing the "Commissioner of Patents, Washington, D. C."